Figure 1:
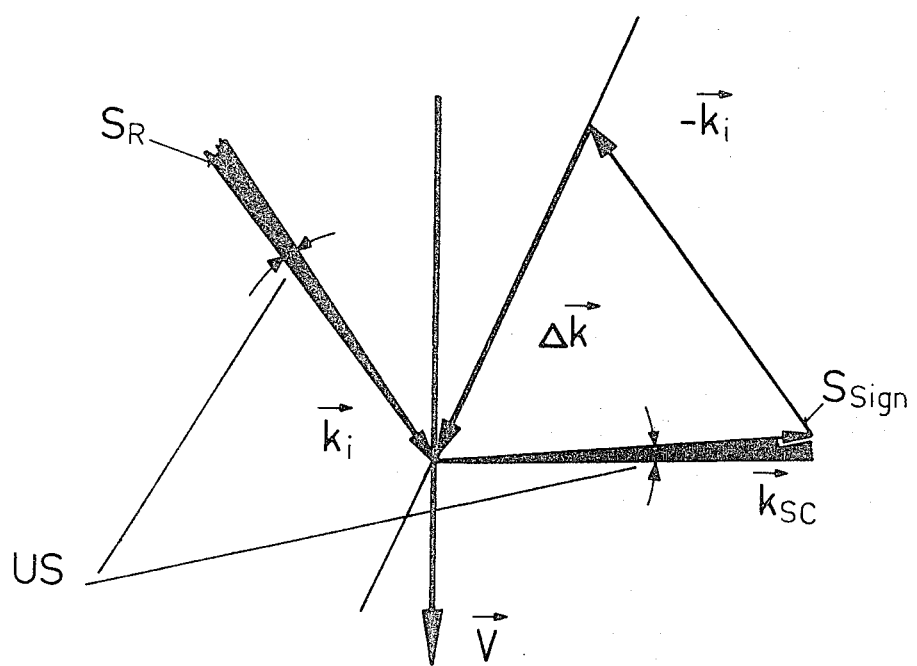

United States Patent [19]

Iten

[11] 3,832,059
[45] Aug. 27, 1974

[54] FLOW VELOCITY MEASURING ARRANGEMENT UTILIZING LASER DOPPLER PROBE

[75] Inventor: Paul Dominik Iten, Oberrohrdorf, Switzerland

[73] Assignee: BBC Aktiengesellschaft Brown, Boveri & Cie, Baden, Switzerland

[22] Filed: June 5, 1973

[21] Appl. No.: 367,148

Related U.S. Application Data

[63] Continuation-in-part of Ser. No. 146,162, May 24, 1971, abandoned.

[30] Foreign Application Priority Data

May 29, 1970 Sweden.............................. 8047/70

[52] U.S. Cl. .................................................. 356/28
[51] Int. Cl. .............................................. G01p 3/36
[58] Field of Search ....................................... 356/28

[56] References Cited
UNITED STATES PATENTS
3,548,655  12/1970  Rudd .................................... 356/28

OTHER PUBLICATIONS
Brayton et al., Proc. 16th Intl. Aerospace Instr. Symposium, 5-1970, pp. 14–26.

*Primary Examiner*—Richard A. Farley
*Assistant Examiner*—S. C. Buczinski
*Attorney, Agent, or Firm*—Pierce, Scheffler & Parker

[57] ABSTRACT

Apparatus for measuring the velocity in fields of flow by means of a self-adjusting laser-doppler probe serving to receive back-scattered signals which includes a single lens which functions both as a transmission and also as a receiving lens. Two coherent laser beams, obtained from a single primary laser beam are fed to this lens symmetrically and parallel to the optical axis of the lens at an axial distance which is smaller than the lens radius and the back-scattering measuring point lies in the focus of the lens and thus in the meeting point of the two beams having different directions after refraction by the lens. The back-scattered light containing the two doppler-shifted frequency components is focussed after passing through the lens by means of an additional optical system coaxial with the optical axis and is then fed to a detector for mixing and heterodyning of the two doppler-shifted frequency components thus to produce an electrical signal which is dependent only upon the doppler differential frequency and hence on the velocity of scattering particles.

5 Claims, 4 Drawing Figures

FLOW VELOCITY MEASURING ARRANGEMENT UTILIZING LASER DOPPLER PROBE

This is a continuation of application Ser. No. 146,162, filed May 24, 1971, now abandoned.

This invention relates to apparatus for measuring the velocity of fluids of flow by means of a self-adjusting laser doppler probe serving to receive back scattered signals, where the measuring point is irradiated by two mutually coherent laser reference beams of equal or practically equal intensity but of different direction and where the back scattered signal beam has two components doppler-shifted in different ways in terms of frequency, from which the doppler differential frequency which is independent of the scattering direction and which depends only on the two reference beam-directions as well as on the velocity of the streaming particles is obtained by mixing or heterodyning.

Apparatus of this type, is described, for example, in the paper by M. Mazumber and D. Wankum: "SNR and Spectral Broadening in Turbulence Structure Measurement Using CW Lasers," in the published reports of the "1969 IEEE Conference on Laser Engineering and Applications." For the explanation of this apparatus and its advantages we will describe first a conventional apparatus utilizing a Laser doppler probe for measuring the velocity in fields of flow.

According to the principle underlying the Laser doppler flow probe, the light beam (reference beam) of a continuous dash laser is focussed on the microscopic range of the field of flow to be investigated (see FIG. 1, reference beam $S_R$). The moving particles of the flow region effect a doppler frequency shift $\omega_d$ in the scattered laser light which is inversely proportional to the vacuum wavelength $\lambda_o$ of the laser light and directionly proportional to the optical index of refraction $n$ of the flowing medium and to the amount and of the cosine of the direction of the velocity vector of the scattering particle relative to the direction of the angle bisector between the reference beam $S_R$ and the scattered beam (signal beam) $S_{sign}$. If $E_o$ is the intensity (field strength) of the reference beam and $\omega_o$ its cyclic frequency, it is represented by the term $E_o \cdot e^{j\omega_o t}$. The scattered beam is then represented by the term $E_{sc} \cdot e^{j(\omega_o + \omega_d)t}$, where $E_{sc}$ denotes the scattering intensity and $\omega_d$ the doppler frequency shift. If we designate the unit vectors of the incident reference beam and of the scattered beam with $\vec{k_i}$ and $\vec{k_{sc}}$ resp., and the velocity vector with $\vec{v}$, we obtain the doppler frequency according to the foregoing considerations from the equation $$\omega_d = 2\pi n/\lambda_o \vec{\Delta k} \cdot \vec{v} = 2\pi N/\lambda_o (\vec{k_{sc}} - \vec{k_i}) \cdot \vec{v}$$

where the point indicates as usual the scalar vector product. A detailed derivation of this formula is given at the end.

The doppler frequency thus depends on the scattering direction $\vec{k_{sc}}$. This means that in such conventional laser doppler probes the accuracy of the measurement is limited by the range (resolution) of the instrument. The latter is given particularly by the aperture angle of the reference-and signal beam, that is, by the aperture of the optical transfer system ("lack of focus" US in FIG. 1). This aperture cannot be random reduced for energetic reasons, but it must be tried to find the optimum between intensity and spectral width of the doppler signal. In the detection of the forward scattering we can use relatively small aperture angles of the cones of rays, and we will still have a useful signal-noise ratio available. But it is practically hopeless to try to detect with this method, for example, the back scattered radiation with technically useful signal-noise ratios by illumination with a He/Ne Laser, since the intensity of the forward and back scattering differs by orders of magnitude with the available scattered particles. This could be achieved at best by increasing the receiveraperture, but this would destroy, as mentioned above, the great spectral resolution inherent in the doppler spectroscopy.

Figure 2:
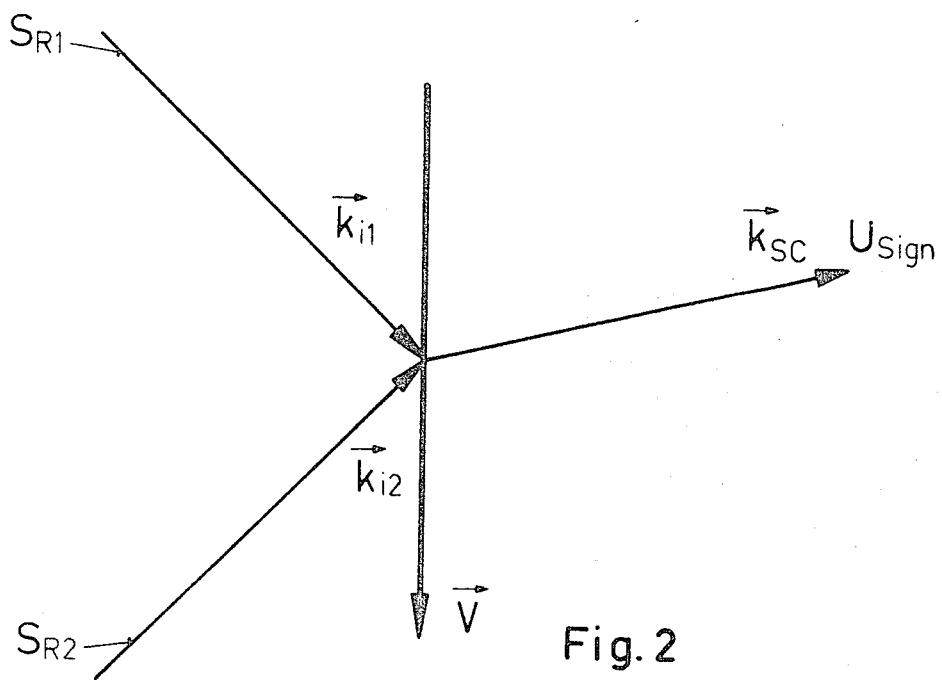

Conventional systems of the above mentioned type are found, for example, in "Applied Physics Letters," vol. 4, No. 10, of May 15, 1964, p. 177, FIG. 2, and in "IEEE Journal of Quantum Electronics," AUg. 1966, p. 177, FIG. 1.

By using the above mentioned doppler differential method it is possible to build up a system whose spectral resolution is independent of the receiver-aperture and which is therefore particularly suitable for the detection of weak back-scattered doppler signals. This method will be described more fully on the basis of FIG. 2.

The measuring point is irradiated by two mutually coherent reference beams $S_{R1}$ and $S_{R2}$ of preferably equal intensity but different direction. The signal scattered into any desired direction contains thus, because of the two illuminating directions $\vec{k_{i1}}$ and $\vec{k_{i2}}$ two doppler-shifted components $E_{sc1} \cdot e^{j(\omega_o + \omega_{d1})t}$ and $E_{sc2} \cdot e^{j(\omega_o + \omega_{d2})t}$. For each of the two doppler frequency shifts applies the foregoing formula:

$$\omega_d = 2\pi n/\lambda^o (\vec{k_{sc}} - \vec{k_i}) \cdot \vec{v}, \text{ so that we obtain:}$$

$$\omega_{d1} = 2\pi n/\lambda_o (\vec{k_{sc}} - \vec{k_{i1}}) \cdot \vec{v}$$

$$\text{and } \omega_{d2} = 2\pi n/\lambda^o (\vec{k_{sc}} - \vec{k_{i2}}) \cdot \vec{v}$$

By means of the known heterodyne technique is formed the doppler differential frequency $$\Delta \omega_d = \omega_{d1} - \omega_{d2} = 2\pi n/\lambda_o (\vec{k_{i2}} - \vec{k_{i1}}) \cdot v$$

It follows that the doppler differential frequency is given by the illuminating directions $\vec{k_{i1}}$ and $\vec{k_{i2}}$ resp. and is independent of the scattering direction $\vec{k_{sc}}$. This means, however, that the spectral resolution is independent of the receiver aperture (lack of focus of observation).

The object of the invention is to provide an improved doppler differential system which is particularly suitable for the reception of back scattered signals, is compact in design, and permits the determination of different velocity ranges with a given band width of the electronic measuring system.

The apparatus according to the invention is characterized in that a single lens is used both as a transmission-and a receiving lens in such manner that two coherent laser beams are fed to this lens symmetrically and parallel to the optical axis of the lens and at an axial distance which is somewhat smaller than the lens radius, and that the back scattering measuring point is in the focus of the lens and thus in the meeting point of the two reference beams having different directions after refraction by the lens, and also that the back scattered light containing the two doppler-shifted frequency components is focussed after passing through the lens by means of an additional optical system coaxial to the optical axis, which is smaller in its radial dimensions than the axial distance of the originally supplied reference beams, and is fed to a detector in which the heterodyning and mixing resp. of the two doppler shifted frequency components and the production of an electric signal depending only on the doppler differential frequency and thus on the velocity of the scattering particles takes place.

Figure 3:
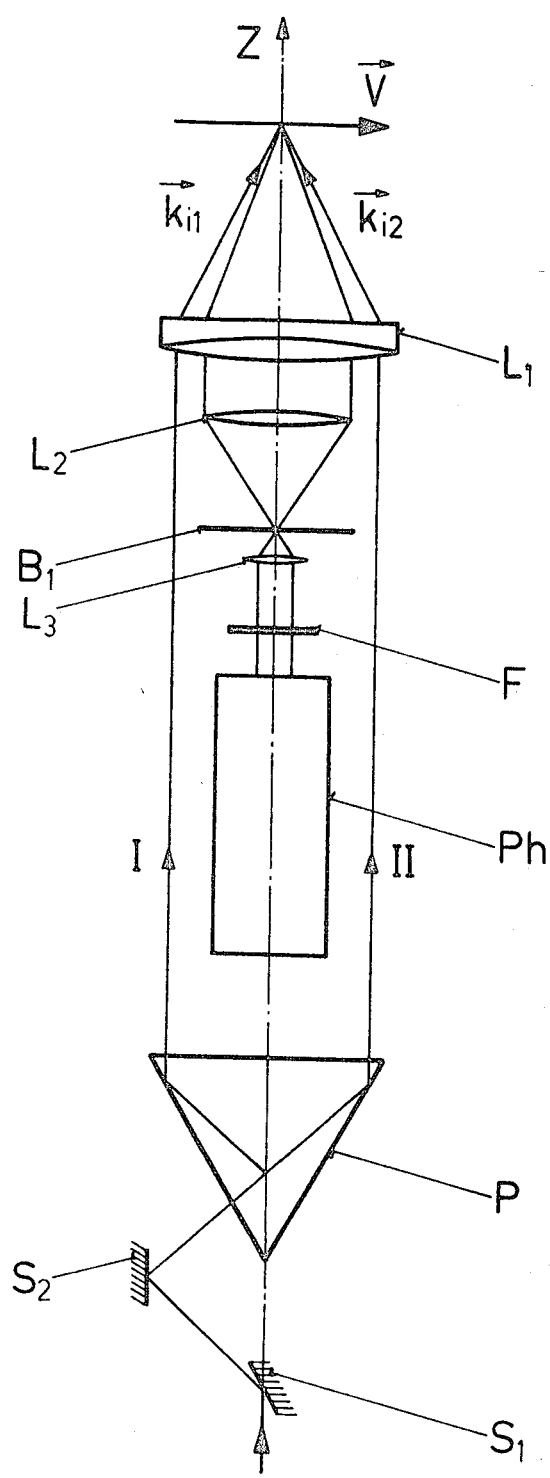

The suggested apparatus will be described more fully on the basis of an embodiment represented in FIG. 3. The primary laser beam, which coincides with the optical axis Z of the lens $L_1$ and of the total system, is deflected by means of two reflectors $S_1$, $S_2$, and is fed to a Koesters prism P, which reflects the beam, as it can be seen from the drawing, on the center plane and lateral surfaces in such a way that two mutually coherent light beams I and II are obtained which are symmetrical and parallel to the optical axis Z and which yield light beams I and II extending with this axis in a plane and which arrive on the lens $L_1$ serving as a transmission and receiving system. The distance of these beams from the optical axis is only slightly less than the radius of the lens $L_1$, so that there is still sufficient room within these beams for the receiving system for the back scattered radiation.

During the passage through the lens $L_1$ the two parallel beams I and II are so refracted that they meet in the focus of the lens. This point is at the same time the measuring point in the flow medium whose direction of motion (velocity vector $\vec{v}$) is perpendicular to the optical axis Z, as represented. The two reference beams I and II have thus after passing through the lens different directions, which are indicated by the unit vectors $\vec{k}_{i1}$ and $\vec{k}_{i2}$, just as in the doppler differential system according to FIG. 2.

The back scattered light, which contains the two frequency components $\omega_o + \omega_{d1}$, $\omega_o + \omega_{d2}$, which depend on $\vec{k}_{i1}$ and $\vec{k}_{i2}$ resp., passes now through the lens $L_1$ in opposite direction and is focussed by the lens $L_2$ arranged behind this lens (seen from the measuring point). In the focal plane of the lens $L_2$ is arranged a very small diaphragm $B_1$. The measuring point is thus reproduced by the lenses $L_1$ and $L_2$ on this diaphragm $B_1$; $L_1$, $L_2$ and $B_1$ form together a filter to increase the spatial resolution, as it is described in U.S. Pat. No. 3,709,599. issued Jan. 9, 1973 and entitled "Laser Doppler Flow Probe With High Spacial Resolution".

After passing through the diaphragm $B_1$, the back scattered light arrives, over an additional lens $L_3$ and an interference filter F, on a photomultiplier Ph, or semiconductor-photo-diode, serving as a detector. Here the electric differential mixed signal (heterodyne signal) is formed, which is proportional to the term $2\pi n/\lambda o\, (\vec{k}_{i2} - \vec{k}_{i1}) \cdot \vec{v} = \Delta\omega_d$ and which can be processed electronically.

The doppler frequency system underlying the above described measuring method, which is suitable for the reception of back scattered signals, is self-adjusting, since the transmission-and receiving lens are realized by one and the same lens $L_1$. This results in a compact integrated design which is particularly suitable for use in practice.

By varying the focal length of the lens $L_1$ (interchangeable lens or zoom) it is possible to vary the angle formed between the reference beam directions $\vec{k}_{i1}$ and $\vec{k}_{i2}$ and thus the calibration constant $a = \omega_d/v$ of the system by about a factor of 20. This permits one to cover different velocity ranges with a given band width of the electronic measuring system.

Finally a second refraction and reflection system can be used to obtain the two parallel beams I and II (FIG. 3) from the primary laser beam, which does away with the reflecting mirrors. This system which is represented schematically in FIG. 4, makes use of a parallelepipedal plane parallel glass plate PG, which is arranged in the optical path length, as shown in the drawing, and which is partially mirrored. The parallel faces $G_1$ and $G_2$ form, with the direction of the incident beam, an adjustable angle other than 90°, and the position of the plate PG is such that the axis of symmetry S extending perpendicularly to the faces $G_1$ and $G_2$ intersects the optical axis Z of the total system. The mirroring is so effected that one half-rectangle of the faces $G_1$, G2 is mirrored, while the other half is transmissive. In the face $G_1$ facing the incident beam, that half of the rectangle is transmissive which is hit by the incident beam, while the second half of the rectangle on the other side of the axis of symmetry S is mirrored with practically total reflection (about 99.7 percent). In the face $G_2$ remote from the incident light, the half-rectangle opposite the transmissive half-rectangle of the other base $G_1$ is semi-transmissive (reflection 50 percent, transmission 50 percent), while the half-rectangle opposite the mirrored half-rectangle of $G_1$ is transmissive.

Figure 4:
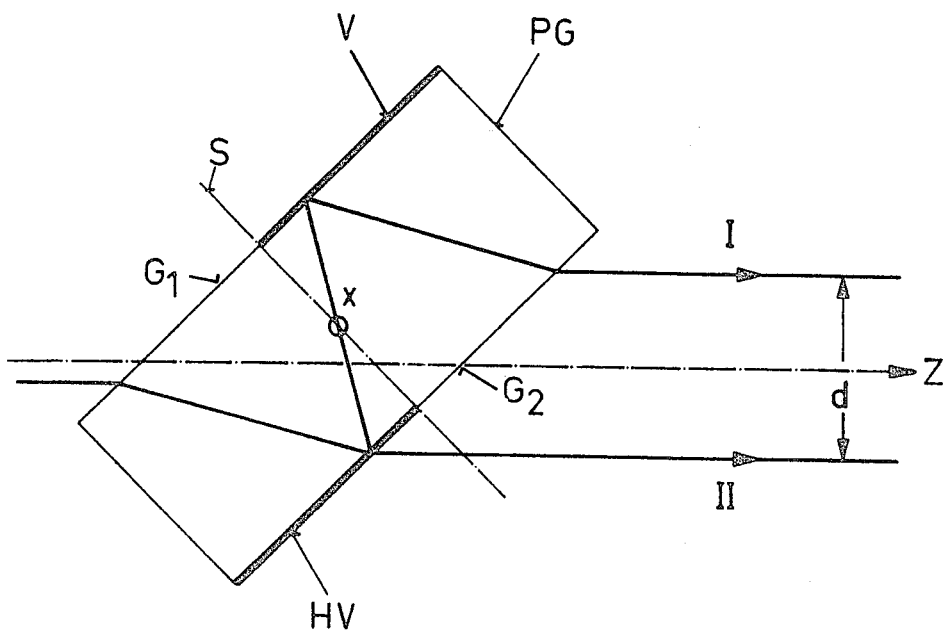

Due to this measure are formed two parallel, and with a suitable position of the plate to the optical axis of the total system, symmetrical beams I and II, of equal intensity, as shown in FIG. 4. Here the parallelism of I and II need no longer be adjusted, but is given by the parallelism of the plate, hence by the production program.

The distance $d$ between the beams I and II can be adjusted by turning the plate about the axis X, which extends perpendicularly to the plane of the light beams through the space center of the plate PG.

By way of supplementation we will derive the term for the doppler cyclic frequency shift $\omega_d$ used above. The fundamental term is $$\omega_d = (\vec{k}_{sc} - \vec{k}_{i1}) \cdot \vec{v} \tag{1}$$

$\vec{k}$ is the wave vector of the light, which contains its direction and frequency $$|\vec{k}| = 2\pi/\lambda \quad \vec{k} = |\vec{k}| \cdot \vec{k} \tag{2}$$

$\vec{k}$ denotes the unit vector of the light which is determinant for the direction. At technical (torrestrial) velocities, the wavelength of the scattered, doppler-shifted light differs substantially from the incident light, that is, $$|\vec{k}_{sc}| \cong |\vec{k}_i| \tag{3}$$

The resulting error is about $10^{-13}$ to $10^{-6} \cdot \vec{k}$ in (1) can therefore be put in front of the parenthesis:

$$\omega_d = \vec{k} \cdot (\vec{k}_{sc} - \vec{k}_i) \cdot \vec{v} = 2\pi/\lambda\, (\vec{k}_{sc} - \vec{k}_i) \cdot \vec{v} \tag{4}$$

Furthermore we have $c = co/n \rightarrow \lambda = \lambda o/n$ (5)
If we substitute (5) in (4), we obtain finally:

$$\omega_d = 2\pi\, n/\lambda \cdot (\vec{k}_{sc} - \vec{k}_i) \cdot \vec{v}$$

I claim:
1. A self-adjustable laser doppler probe of the optical type for measuring flow velocity at a point of measure- ment in a field of flow which comprises a laser situated along the optical axis of the probe from which are produced two mutually coherent parallel spaced laser reference beams having substantially equal intensity and which are located at opposite sides of and at equal distance from the optical axis, a first lens located coaxially along said optical axis, said first lens serving both to transmit said parallel spaced reference beams from two different directions to a measuring point in the flow field located at the focus of said lens and also to receive back scattered light having two components doppler-shifted in different ways in terms of frequency which is independent of the scattering direction and which depends only upon the direction of said reference beams as well as upon the velocity of the scattering particles, an optical system including a second lens located along said optical axis between said reference beams for receiving the doppler-shifted frequency components of the back scattered light passed backwardly through said first lens, the relative diameters of said first and second lenses being such that said reference beams pass uninterruptedly outside the periphery of said second lens and through the peripheral portion of said first lens and said back scattered light passes in an uninterrupted manner through said first lens and through the entire portion of said second lens, and detector means following said optical system for mixing and heterodyning said two doppler-shifted frequency components passed through said second lens thereby to produce an electrical signal dependent only upon the doppler differential frequency and thus the velocity of the scattering particles.

2. A self-adjustable laser doppler probe according to claim 1 wherein the said two reference beams are obtained from a single primary laser beam coinciding with the optical axis of the probe by means of a Koesters prism arranged symmetrically with respect to said optical axis and which in conjunction with two mirrored surfaces establish an angle of incidence of the beam into said prism such that the two reflected beams emerging from said prism are mutually parallel and symmetrical to each side of said optical axis.

3. A self-adjustable laser doppler probe according to claim 1 wherein the said two reference beams are obtained from a single primary laser beam parallel to the optical axis of the probe by means of a partially mirrored parallelepipedal plane-parallel glass plate, first and second oppositely located parallel faces of said plate being disposed at an angle other than 90° in relation to the direction of the incident single laser beam, said plate being positioned in relation to said optical axis such that the axis of symmetry of said plate extending perpendicularly to said oppositely located parallel faces intersects said optical axis, a half-rectangular portion of said first face located to one side of said axis of symmetry and on which the incident laser beam impinges being transmissive, and the other half-rectangular portion of said first face located at the other side of said axis of symmetry being totally reflective, a half-rectangular portion of said second face at the beam leaving side of said plate located to the same side of said axis of symmetry as is said transmissive half-rectangular portion of said first face being semi-reflective, and the other half-rectangular portion of said second face located to the same side of said axis of symmetry as is said totally reflective half-rectangular portion of said first face being transmissive.

4. A self-adjustable laser doppler probe according to claim 1 wherein said optical system which is located along said optical axis and which receives the two doppler-shifted frequency components of the back scattered light includes a diaphragm having a small aperture located in the focal plane of said second lens, a third lens located at a distance equal to its focal length behind said diaphragm, and an interference filter.

5. A self-adjustable laser doppler probe according to claim 1 wherein said first lens includes means for varying the focal length thereof thereby to vary the angle formed between said reference beams as they exit from the lens and thus effect a variation in the calibration constant of the probe thereby to enable different velocity ranges to be covered with a given bandwidth of said detector means.

* * * * *